United States Patent
Lau et al.

(10) Patent No.: US 10,368,284 B2
(45) Date of Patent: Jul. 30, 2019

(54) QUALITY OF EXPERIENCE-BASED HANDOVER MANAGEMENT

(71) Applicant: T-Mobile USA, Inc., Bellevue, WA (US)

(72) Inventors: Kevin Lau, Issaquah, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/695,733

(22) Filed: Apr. 24, 2015

(65) Prior Publication Data
US 2016/0135104 A1    May 12, 2016

Related U.S. Application Data

(60) Provisional application No. 62/078,851, filed on Nov. 12, 2014.

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0083* (2013.01); *H04W 36/26* (2013.01);
(Continued)

(58) Field of Classification Search
CPC . H04W 36/30; H04W 36/0088; H04W 36/14; H04W 88/08; H04W 36/0083; H04W 36/0094; H04W 36/08
See application file for complete search history.

(56) References Cited

U.S. PATENT DOCUMENTS

2002/0068569 A1*  6/2002  Chen ................... H04W 76/028
                                                           455/437
2002/0168982 A1   11/2002  Sorokine et al.
(Continued)

OTHER PUBLICATIONS

"International Search Report and Written Opinion" for PCT/US2015/046330, dated Dec. 1, 2015, 11 pages.
(Continued)

*Primary Examiner* — Dinh Nguyen
(74) *Attorney, Agent, or Firm* — Han Santos, PLLC

(57) ABSTRACT

A telecommunication carrier may use quality of experience metrics to manage user device handovers. A handover controller may receiving a quality metric value obtained by a user device for a current base station of a carrier network. The quality metric value may measure quality of experience characteristics of an application that is in communication with the current base station. The handover controller may compare the quality metric value to a corresponding quality metric value for an adjacent base station of the carrier network. The corresponding quality metric value may measure the quality of experience characteristics of an additional application that communicated with the adjacent base station. When the corresponding quality metric value is greater than the quality metric value, the handover controller may command the user device to perform a handover that switches the user device from communicating with the current base station to communicating with the adjacent base station.

20 Claims, 9 Drawing Sheets

(51) Int. Cl.
  *H04W 36/26* (2009.01)
  *H04W 88/12* (2009.01)
  *H04W 36/08* (2009.01)

(52) U.S. Cl.
  CPC ........ *H04W 88/12* (2013.01); *H04W 36/0094* (2013.01); *H04W 36/00837* (2018.08); *H04W 36/08* (2013.01)

(56) References Cited

U.S. PATENT DOCUMENTS

| | | | |
|---|---|---|---|
| 2003/0202485 A1* | 10/2003 | Mansfield | H04B 7/264 370/328 |
| 2004/0170191 A1 | 9/2004 | Guo et al. | |
| 2005/0096051 A1 | 5/2005 | Lee et al. | |
| 2006/0268756 A1* | 11/2006 | Wang | H04W 36/32 370/310 |
| 2007/0019579 A1* | 1/2007 | Xu | H04H 20/42 370/312 |
| 2007/0026861 A1 | 2/2007 | Kuhn et al. | |
| 2008/0014956 A1* | 1/2008 | Balasubramanian | H04L 41/0806 455/452.1 |
| 2008/0212537 A1* | 9/2008 | Bukai | H04W 36/30 370/332 |
| 2009/0154426 A1* | 6/2009 | Perraud | H04W 36/26 370/332 |
| 2009/0163223 A1* | 6/2009 | Casey | H04W 36/22 455/453 |
| 2010/0173632 A1 | 7/2010 | Kitaji | |
| 2010/0329225 A1 | 12/2010 | Balasubramanian | |
| 2011/0134881 A1 | 6/2011 | Sanders et al. | |
| 2011/0211464 A1* | 9/2011 | Chetlur | H04L 41/5067 370/252 |
| 2011/0244863 A1* | 10/2011 | Matsuo | H04W 36/04 455/436 |
| 2011/0314145 A1* | 12/2011 | Raleigh | H04L 41/0893 709/224 |
| 2012/0129517 A1* | 5/2012 | Fox | H04L 41/5025 455/425 |
| 2012/0164979 A1* | 6/2012 | Bachmann | H04L 63/164 455/411 |
| 2013/0114704 A1* | 5/2013 | Chen | H04N 19/56 375/240.12 |
| 2013/0165084 A1* | 6/2013 | Xu | H04W 4/003 455/414.1 |
| 2014/0155043 A1 | 6/2014 | Gell et al. | |

OTHER PUBLICATIONS

Partial Supplementary European Search Report for European Application No. EP2015858274 dated Apr. 17, 2018, 10 pages.
European Application No. 15858274.2, Office Action, dated Mar. 6, 2019, 7 pages.

\* cited by examiner

QUALITY OF EXPERIENCE-BASED HANDOVER MANAGEMENT

CROSS REFERENCE TO RELATED PATENT APPLICATION

This application claims priority to U.S. Provisional Patent Application No. 62/078,851, filed on Nov. 12, 2014, entitled "Application QOE Based Mobility Management," which is hereby incorporated by reference in its entirety.

BACKGROUND

Wireless communication devices are integral to the daily lives of most users. Wireless communication devices are used to make voice calls, check email and text messages, update social media pages, stream media, browse websites, and so forth. As a result, users of wireless communication devices expect telecommunication carriers to provide constant and reliable telecommunication and data communication service at all times.

As a user roams over a geographical area, a wireless communication device of the user that is engaged in an ongoing voice call or data session with a carrier network may be transferred from one base station or another base station of the carrier network. In other words, the wireless communication device may terminate an existing wireless communication connection with a first base station and establish a new wireless communication connection with a second base station without interrupting the voice call or data session. This transfer of the wireless communication device between the multiple radio cells provided by the base stations may be referred to as a handover.

Handovers may be trigger by radio signal strength or quality as detected by a wireless communication device. For example, as the radio signal strength emanating from a first radio cell to the wireless communication device falls below a threshold and the radio signal strength emanating from a second base station rises above the threshold, a carrier network may trigger the wireless communication device to switch its communication connection from the first base station to the second base station. However, carrier networks generally apply the same signal strength or quality threshold values to trigger handovers for all wireless communication devices, regardless of data usage, service being actually utilized, device type, or other factors that are related to the operations of the devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
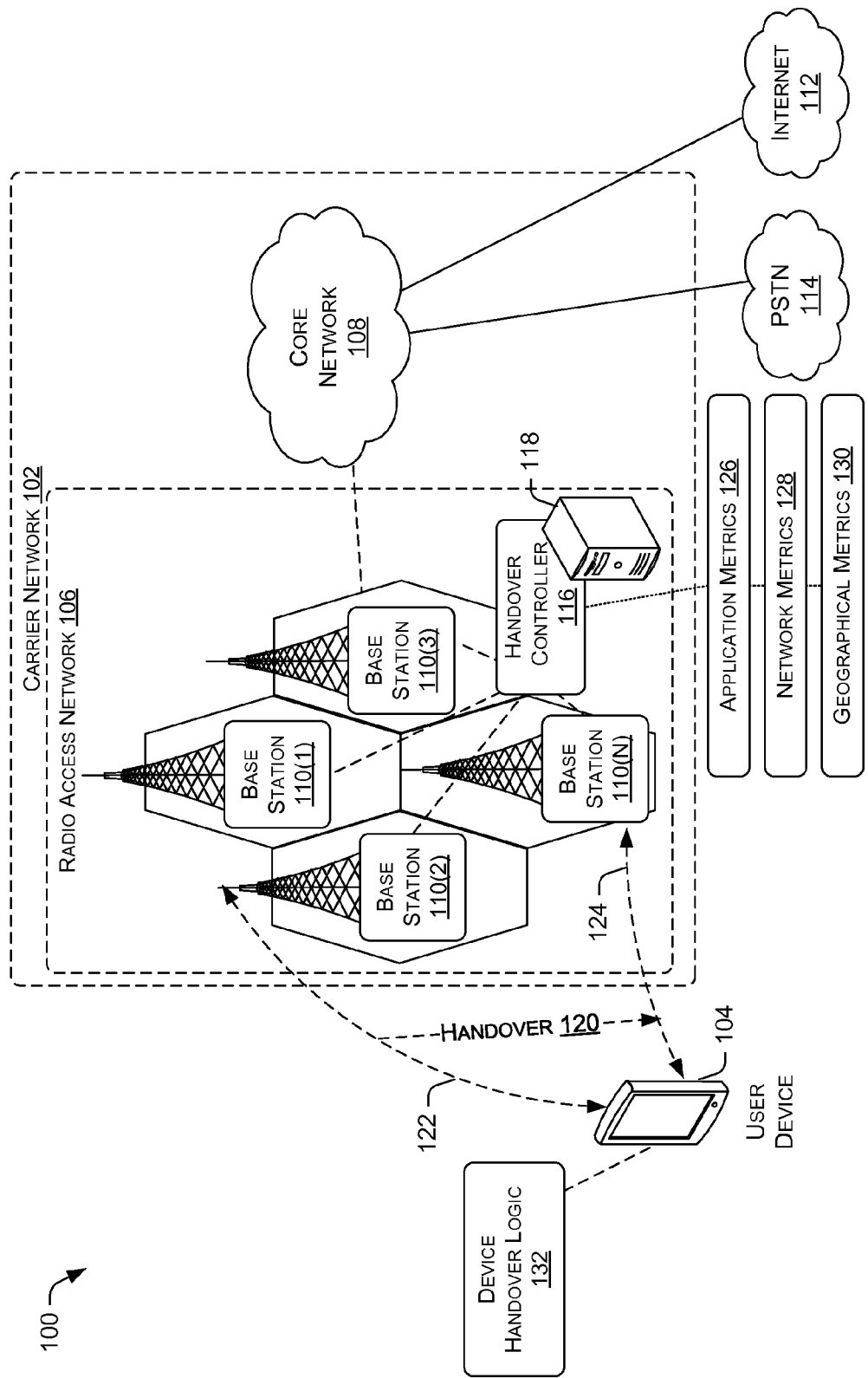
FIG. 1 illustrates an example network architecture for implementing quality of experience-based handover management.

This disclosure is directed to techniques for performing quality of experience-based handover management for a user device that communicate with the wireless network of a telecommunication carrier. Handover management supervises the transfer of a user device that is engaged in an ongoing voice call or data session with a carrier network from one base station to another base station of the carrier network as the user device roams in a geographical area. Proper handover management enables the wireless communication device to terminate an existing wireless communication connection with a first base station and establish a new wireless communication connection with a second base station without interrupting the voice call or data session.

Quality of experience-based handover management may compare quality of experience metrics associated with a current base station and an adjacent base station to determine whether to perform a handover of the user device between the cells. The quality of experience metrics may reflect the performance of one or more applications at the radio cells. As such, a handover of the user device may occur if the quality of experience metrics at an adjacent base station is superior to comparable metrics at a current base station. The quality of experience metric for a video streaming application may be calculated based on a video mean opinion score (MOS) for a time period, a number of video stall events in a time period, a number of adaptive bit rate changes in a time period, a number of audio/video synchronization failure events in a time period, and/or a combination of such factors. The quality of experience metric for a voice call application may be calculated based on an audio MOS, a number of audio loss events in a time period, and/or a combination of such events. In an additional example, the quality of experience metric for a gaming application may be calculated based on network latency in response to a user input.

In some embodiments, quality of experience-based handover management may concurrently take into consideration geography and network related quality metrics for the purpose of managing handovers. These quality metrics may include geographical influences on network signal robustness and communication network signal attenuation characteristics.

In other instances, quality of experience-based handover management may convert a difference in corresponding quality metrics at a current base station and at an adjacent base station into a signal robustness offset value for the adjacent base station. The signal robustness offset value is then used by a handover controller of the carrier network to determine whether to maintain the user device at the current base station or switch the user device to the adjacent base station. In some embodiments, the handover controller of the carrier network may have a dynamic feedback mechanism that assesses the effect of the quality of experience-based handovers. In this way, the handover controller may adaptively adjust the conversion of application quality of experience characteristics into quality metric values to optimize carrier network performance for multiple user devices.

In at least one embodiment, a handover controller may receive a quality metric value obtained by a user device for a current base station of a carrier network. The quality metric value may measure quality of experience characteristics of an application that is in communication with the current base station. The handover controller may compare the quality metric value to a corresponding quality metric value at an adjacent base station of the carrier network. The corresponding quality metric value may measure the quality of experience characteristics of an additional application that communicated with the adjacent base station. When the corresponding quality metric value at the adjacent base station is greater than the quality metric value at the current base station, the handover controller may command the user device to perform a handover that switches the user device the current base station to the adjacent base station.

The techniques may enable a telecommunication carrier to use quality of experience metrics that measure the performance of user device applications at multiple radio cells of a carrier network to manage user device handovers. Such handover management avoids the use of network signal strength or quality as the sole basis for performing handovers. The use of signal strength or quality fails to account for different service demands of various applications on user devices. Thus, having the capability to adjust handover criteria on a per application basis provides flexibility in network performance optimization. The techniques described herein may be implemented in a number of ways. Example implementations are provided below with reference to the following FIGS. 1-9.

Example Network Architecture

FIG. 1 illustrates an example scheme 100 for implementing quality of experience-based handover management. The scheme 100 may include a carrier network 102 and a user device 104. The carrier network 102, as operated by a telecommunication carrier, may include a radio access network 106 and a core network 108. The carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The radio access network 106 may include base stations 110(1)-110(N). The base stations 110(1)-110(N) are responsible handling voice and data traffic between user devices, such as the user device 104, and the core network 108. Accordingly, each of the base stations 110(1)-110(N) provide a corresponding radio cell that delivers telecommunication and data communication coverage. The core network 108 may use the radio cells to provide communication services to multiple user devices. For example, the core network may connect the user device 104 to other telecommunication and data communication networks, such as the Internet 112 and the public switched telephone network (PSTN) 114. In various embodiments, the core network 108 may include one or more servers that implement network components. The network components may include a serving GPRS support node (SGSN) that routes voice calls to and from the PSTN 114, a Gateway GPRS Support Node (GGSN) that handles the routing of data communication between external packet switched networks and the core network 108. The network components may further include a Packet Data Network (PDN) gateway (PGW) that routes data traffic between the GGSN and the Internet 112.

The user device 104 may be a smartphone, a tablet computer, an embedded computer system, or any other device that is capable of using the wireless communication services that are provided by the telecommunication carrier. In various embodiments, a user may use the user device 104 to make voice calls, send and receive text messages, and download content from the Internet 112.

The handover of the user device 104 between the base stations 110(1)-110(N) may be managed by a handover controller 116. The handover controller 116 may be implemented by one or more computing devices 118 that are a part of the radio access network 106 or the core network 108. The handover controller 116 may use quality of experience metrics associated with the user device 104 to perform handovers. For example, the handover controller 116 may perform a handover 120 that switches the user device 104 from a radio cell generated by the base station 110(2) to an adjacent radio cell generated by the base station 110(N). In other words, the handover controller 116 may switch the user device 104 from a communication connection 122 with the base station 110(2) to a communication connection 124 with the base station 110(N).

In various embodiments, the handover controller 116 may perform the handover 120 if the predicted quality of experience metrics that will be experienced by the user device 104 at an adjacent base station is superior to comparable metrics currently experience by the user device 104 at a current base station. The quality of experience metrics may include application metrics 126. For example, the quality of experience metric for an video streaming application on the user device 104 may be calculated based on a video mean opinion score (MOS) in a time period, a number of video stall events in a time period, a number of adaptive bit rate changes in a time period, a number of audio/video synchronization failure events in a time period, and/or a combination of such factors.

Accordingly, in one scenario, the user device 104 connected to the base station 110(2) may be streaming video via a video streaming application. The strength of the signal received by the user device 104 from the base station 110(2) may be slightly stronger than the strength of the signal received from the base station 110(N). Additionally, a quality metric for the video streaming application may indicate that the streaming application has experienced five adaptive bit rate changes in the last 10 minutes while connected to the base station 110(2). However, the handover controller 116 may predict a quality metric for the video streaming application indicating that the streaming application would have experienced less bit rate changes in the last 10 minutes if the user device 104 had been connected to the base station 110(N). As such, the handover controller 116 may initiate a handover of the user device 104 from the base station 110(2) to the base station 110(N) even though the user device 104 is currently receiving a stronger signal from the base station 110(2).

In other instances, the quality of experience metric for a voice call application may be audio MOS, a number of audio loss events in a time period, and/or a combination of such events. In additional instances, the quality of experience metric for a gaming application may be calculated based on network latency in response to user input. In these instances, the handover controller 116 may initiate the handover 120 of the user device 104 even if the base station 110(2) has a stronger signal than the base station 110(N), provided that the relevant quality of experience metric for the base station 110(N) is superior to the comparable quality of experience metric for the base station 110(2).

In additional instances, the quality of experience metrics may include network metrics 128 and geographical metrics 130. The network metrics 128 may include metrics that represent signal characteristics of the signals provided by the base stations, such as waveform shape, wave spectrum, and/or attenuation characteristics. The geographical metrics 130 may include metrics that measure geographical influences on network signal robustness, such as the effect of natural and/or artificial obstacles that block radio signals. Thus, these metrics may also play a role in shaping handover decisions made by the handover controller 116.

In other embodiments, the user device 104 may also play a role in performing quality of experience-based handover management. In such embodiments, the user device 104 may include device handover logic 132. The device handover logic 132 may convert a difference in corresponding quality metrics at a current radio cell (e.g., base station 110(2)) and predicted for an adjacent radio cell (e.g., base station 110(N)) into a signal robustness offset value for the adjacent radio cell. The signal robustness offset value is then transmitted by the device handover logic 132 to the handover controller 116. In turn, the handover controller 116 may use the signal robustness offset value in making a decision as to whether to maintain the user device at the current base station or switch the user device to the adjacent base station. In one example, the handover controller 116 may combine the signal robustness offset value with a predicted signal robustness value of the base station 110(N) to generate a modified signal robustness value. The handover controller 116 may compare the modified signal robustness value to the current signal robustness value for the base station 110(2).

Accordingly, the handover controller 116 may initiate the handover of the user device 104 from the base station 110(2) to the base station 110(N) if the modified signal robustness value is greater than the current signal robustness value. In contrast, the handover controller 116 may command the user device 104 to maintain a connection with the base station 110(2) if the modified signal robustness value at the base station 110(N) is less than or equal to the current signal robustness value at the base station 110(2). In this way, the capability to adjust handover criteria as provided by the handover controller 116 and the device handover logic 132 may provide flexibility in network performance optimization.

Example User Device Components

Figure 2:
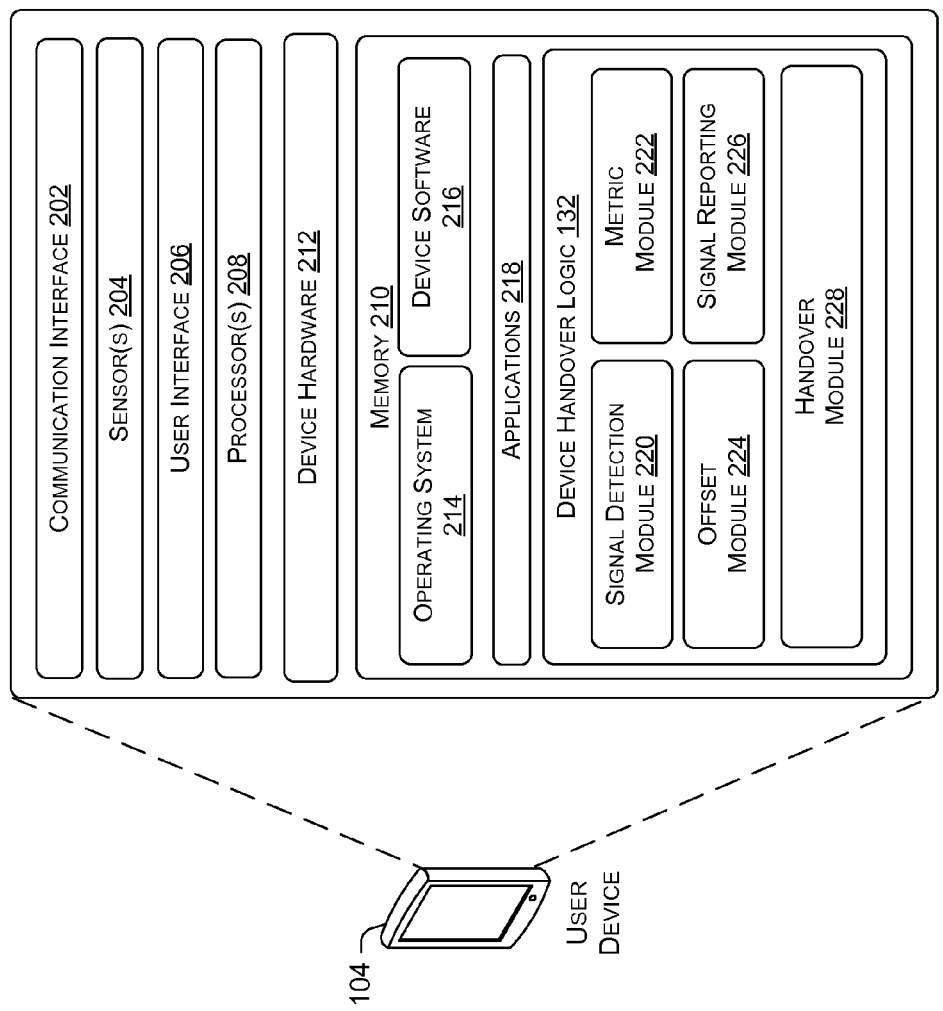
FIG. 2 is a block diagram showing various components of an illustrative user device that implements quality of experience-based handover management.

FIG. 2 is a block diagram showing various components of an illustrative user device that implements quality of experience-based handover management. The user device 104 may include a communication interface 202, one or more sensors 204, a user interface 206, one or more processors 208, and memory 210.

The communication interface 202 may include wireless and/or wired communication components that enable the electronic device to transmit or receive voice or data communication via the carrier network 102, as well as other telecommunication and/or data communication networks. The sensors 204 may include a proximity sensor, a compass, an accelerometer, and/or a global positioning system (GPS) sensor. The proximity sensor may detect movement of objects that are proximate the user device 104. The compass, the accelerometer, and the GPS sensor may detect orientation, movement, and geolocation of the user device 104.

The user interface 206 may enable a user to provide inputs and receive outputs from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include other hardware that is typically located on a user device. For example, the device hardware 212 may include signal converters, antennas, modems, hardware decoders and encoders, graphic processors, a subscriber identity module (SIM) card slot, and/or the like that enable the user device 104 to execute applications and provide telecommunication and data communication functions. A SIM card may be inserted into the SIM card slot of the user device 104. Accordingly, the SIM card may enable the user device 104 to obtain telecommunication and/or data communication services from the telecommunication carrier.

The one or more processors 208 and the memory 210 of the user device 104 may implement an operating system 214, device software 216, one or more applications 218, and the device handover logic 132. The operating system 214 may include components that enable the user device 104 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with a modem of the user device 104. Additionally, the operating system 214 may include other components that perform various other functions generally associated with an operating system. The device software 216 may include software components that enable the user device to perform functions and control hardware components of the user device 104. For example, the device software 216 may include switching software that enables the user device 104 to establish and terminate communication channels with different base stations, such as the base stations 110(1)-110(N) by performing soft handovers or hard handovers.

The applications 218 may include applications that provide utility, entertainment, and/or productivity functionalities to a user of the user device 104. For example, the applications 218 may include telephony applications, electronic mail applications, remote desktop applications, web browser applications, navigation applications, office productivity applications, media streaming applications, gaming applications, and/or so forth.

The device handover logic 132 may include a signal detection module 220, a metric module 222, an offset module 224, a signal reporting module 226, and a handover module 228. These modules may include routines, program instructions, objects, and/or data structures that perform particular tasks or implement particular abstract data types.

The signal detection module 220 may detect the signal robustness of the base station signals that are received by the user device 104, such as the signals that are received from the base stations 110(1)-110(N). Signal robustness may be measured by the signal detection module 220 in a multitude of ways, such as via signal strength or signal quality. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. The signal detection module 220 may monitor the signal robustness of a base station (radio cell) currently in communication with the user device 104, as well as the signal robustness of one or more adjacent base stations (radio cells). The signal detection module 220 may provide the signal robustness measurements to the handover controller 116. In turn, the handover controller 116 may initiate handovers of the user device 104 between different based stations at least partially based on the signal robustness measurements as the user device 104 roams in a geographical area.

The metric module 222 may generate quality metric values that represent the quality of experience factors for applications on the user device 104 that are actively using a communication connection with a base station. In some instances, the metric module 222 may calculate a quality metric value for a video streaming application based on a video MOS for a time period, a number of video stall events in a time period, a number of adaptive bit rate changes in a time period, a number of audio/video synchronization failure events in a time period, or other factors. For example, the metric module 222 may assign a quality metric value of "5" when a video streaming application did not experience any video stall events in a time period (e.g., the last 10 minutes). Otherwise, the metric module 222 may assign a quality metric value of "4" if the video application experienced one video stall event, a quality metric value of "3" if the video application experienced two video stall event, and so on and so forth. In various embodiments, such quality metric values may be proportionally assigned using any standardized scoring scale, provided that higher quality metric value represent higher quality of experience and a lower quality metric value represents lower quality of experience.

In other embodiments, the metric module 222 may calculate a quality metric value that represents multiple quality of experience factors for the video streaming application, rather than a single factor. For example, the quality metric value may be calculated based on both the number of video stall events and the number of adaptive bit rate changes in the time period. In such embodiments, the metric module 222 may calculate an individual quality metric value for each of the quality of experience factors of the video streaming application, then aggregate the individual quality metric values into a combined quality metric value for the video streaming application. In at least one embodiment, the aggregation may involve standardizing or normalizing the values prior to aggregation. Such standardization or normalization may be performed using weighting factors, coefficient multipliers, and/or so forth. The standardization or normalization may account for differences in the occurrence frequencies of different quality of experience events, as well as compensate for differences in their impact on perceived quality of experience. For example, a video stall event is likely to impact the quality of experience for a user significantly more than an adaptive bit rate change event.

In other instances, the quality metric value for a voice call application may be calculated based on an audio MOS, a number of audio loss events in a time period, and/or a combination of such events. In an additional instances, the quality metric value for a gaming application may be calculated based on network latency in response to user input. The network latency may be a time between when a request for data is initiated at the game application and response data is received by the game application. In these instances, the metric module 222 may also calculate a quality metric value that represents multiple quality of experience factors for a single application (e.g., both audio MOS and number of audio loss events for the voice call application) in a manner similar to as described with respect to the video streaming application.

In other embodiments, the metric module 222 may calculate a single quality metric value for quality of experience associated with multiple applications. For example, a user device 104 may be using a communication connection to simultaneously stream video while making a voice call. In such an example, the metric module 222 may calculate a single quality metric value that represents the quality of experience for the simultaneous video streaming and voice call. The single quality metric value may be calculated by assessing an individual quality metric value for each of the quality of experience factors of the individual applications, then aggregate the individual quality metric values into a combined quality metric score. The aggregation of the individual quality metric values may be achieved through the standardization or the normalization of these values prior to aggregation.

In another example, a gaming application on the user device 104 may include an embedded video streaming application. Accordingly, the gaming application may automatically trigger the video streaming application to download video through a communication connection with a base station while simultaneously sending and receiving data to a server via the communication connection. In such an example, the metric module 222 may calculate a single quality metric value that represents the quality of experience for the simultaneous video streaming and gaming playing. Once again, the single quality metric value may be calculated by assessing an individual quality metric value for each of the quality of experience factors of individual applications, then aggregate the individual quality metric values into a combined quality metric score. The aggregation of the individual quality metric values may be achieved through the standardization or the normalization of these values prior to aggregation.

The metric module 222 may transmit the quality metric values and associated information to the handover controller 116. The associated information for a quality metric value may include an identity of the application for which the value is obtained, a type of the application, and an identity of the connected base station at the time the value is obtained. The associated information may further include a distance of the user device 104 to the connected base station at the time the value is obtained, a position of the user device 104 relative the connected base station, the time period associated during which the quality metric value, the date and the start and the end time of the time period, and an operating system type of the user device 104. The position of the user device 104 may be provided in the form of geographical coordinates, geographical offset values from the location of the base station, and/or so forth. In turn, the handover controller 116 may use the quality values and associated information to initiate handovers.

The offset module 224 may obtain the quality metric values from the metric module 222. The offset module 224 may also obtain corresponding quality metric values for adjacent base stations. A quality metric value may be a corresponding value when it is for the same application or a comparable type of application, is obtained at an identical or approximately identical distance from an adjacent base station. Alternatively, instead of an identical or approximately identical distance from an adjacent base station, the corresponding value may be obtained at an identical or approximately identical relative position to the adjacent base station. For example, a quality metric value for an application executing on the user device 104 may be obtained when the device is 2 miles due north and 2.5 miles due west of a current base station that is communicating with the user device 104. Accordingly, a corresponding quality metric value may be a value for the same application that is obtained 2 miles due north and 2.5 miles due west of an adjacent base station.

The offset module 224 may use a quality metric translation algorithm to compare a quality metric value of a currently connected based station to a corresponding quality metric value and generate a signal robustness offset value. The signal robustness offset value may be a signal strength offset value or a signal quality offset value, depending on the particular indicator being measured by the user device 104. For example, if the quality metric value associated with a currently connected base station is "10" and a corresponding signal quality offset value for an adjacent base station is "8", the quality metric translation algorithm may translate the difference of "2" in the quality metric values to a signal robustness offset value of "20". In various embodiments, the quality metric translation algorithm may use different conversion multipliers for quality metric values of different applications or different combination of application. Furthermore, the conversation multipliers of the quality metric translation algorithm may be dynamically changed based on updated multiplier values received from the handover controller 116.

Alternatively or concurrently, the offset module 224 may generate one or more additional signal robustness offset values based on device factors, geographical factors, and/or network factors. These additional signal robustness offset values when the quality metric values and their corresponding metric values are derived for sources, i.e., applications, which differ in these associated characteristics. These factors may be recognized by the quality metric translation algorithm, which may take them into account when assigning the signal robustness offset value. Device factors may include the nature and type of the application on the user device 104 that is currently sending and receiving data. For example, some streaming application may have greater buffer capacity or more data interruption tolerant codecs, and therefore would be more forgiving of network glitches and signal fading. Accordingly, the quality metric translation algorithm may generate an additional signal robustness offset set that is scaled according to the nature and type of the application on the user device.

Other device factor may be the type or nature of the operating system or the network transceiver on the user device 104. Some operating systems or network transceivers may be more tolerant of network signal fluctuations than other operating systems or network transceivers. Thus, the quality metric translation algorithm may generate an additional negative signal robustness offset value when one or more device factors indicate that the user device 104 is more tolerant of network signal errors. In contrast, a user device 104 that is less tolerant of network signal errors may result in the generation of a positive signal robustness offset value. In various embodiments, the offset module 224 may access these device factors via application program interfaces (APIs) that are provided by the application layer, the operating system layer, the hardware layer, and/or other layers of the user device 104.

Geographical factors may include sites with obstructed network signals. An obstructed network signal may be a signal that is partially or completely blocked by a natural or manmade obstacle. In such instances, the handover controller 116 may transmit data regarding such locations belonging to a current base station or an adjacent station to the offset module 224. In turn, the offset module 224 may use the quality metric translation algorithm to generate an additional signal robustness offset value. For example, the quality metric translation algorithm may generate a positive signal robustness offset value when a current location of the user device 104 corresponds to a site of a currently connected base station with an obstructed network signal. In contrast, the quality metric translation algorithm may generate a negative signal robustness offset value when a current location of the user device 104 corresponds to a site of an adjacent base station with an obstructed network signal.

Network factors may include the characteristics of the network signals that are generated by the base stations. For example, network signals of some frequencies and/or output power may fade out gradually as distance to the transceiver increases. However, network signals of other frequencies and/or output power may steeply degrade as distance to the transceiver increases. In such instances, the handover controller 116 may transmit data regarding the network signal characteristics of a current base station or an adjacent base station to the offset module 224.

In turn, the offset module 224 may use the quality metric translation algorithm to generate an additional signal robustness offset value. For example, the quality metric translation algorithm may generate an additional negative signal robustness offset value when a currently connected base station with the user device 104 has a more gradual signal fading characteristic than an adjacent base station, and vice versa. In some embodiments, the quality metric translation algorithm may use a static or dynamically modifiable conversion mapping to convert the device factors, geographical factors, and/or network factors into signal robustness offset values. The offset module 224 may aggregate all generated signal robustness offset values that are produced for a base station into a single signal robustness offset value for the base station.

The signal reporting module 226 may report signal robustness values to the handover controller 116. The signal robustness values may include values for the currently connected base station (e.g., base station 110(1)), as well as one or more adjacent base stations (e.g., base station 110(N)). In various embodiments, the signal reporting module 226 may modify the signal robustness value for an adjacent base station with a corresponding signal robustness offset value for the adjacent base station to generate a modified signal robustness value that is reported to the handover controller 116.

The modified signal robustness value may change a handover decision made by the handover controller 116. For example, if the signal robustness value for a currently connected base station is "85" and the signal robustness value for an adjacent base station is "70", no handover will occur because "70" is less than "85". However, if the signal robustness offset value of "20" results in a modified signal robustness value of "90" for the adjacent base station, then the handover controller 116 may initiate a handover of the user device 104 to the adjacent base station. In some embodiments, the signal reporting module 226 may verify that the signal robustness value of an adjacent base station is above a threshold before generate a modified signal robustness value. This verification avoids the unnecessary generation of modified signal robustness values in instances when the adjacent base station lacks sufficient signal robustness.

The handover module 228 may switch the user device 104 from a currently connected base station to an adjacent base station upon receive a command from the handover controller 116. For example, upon receiving a handover command, the handover module 228 may terminate the communication connection between the user device 104 and the base station 110(1), and establish a communication connection for the user device 104 with the base station 110(N). In various embodiments, the handover module 228 may cause the user device 104 to perform a soft handover or a hard handover, depending on the capabilities of the user device 104 and/or the carrier network 102.

Example Handover Controller Components

Figure 3:
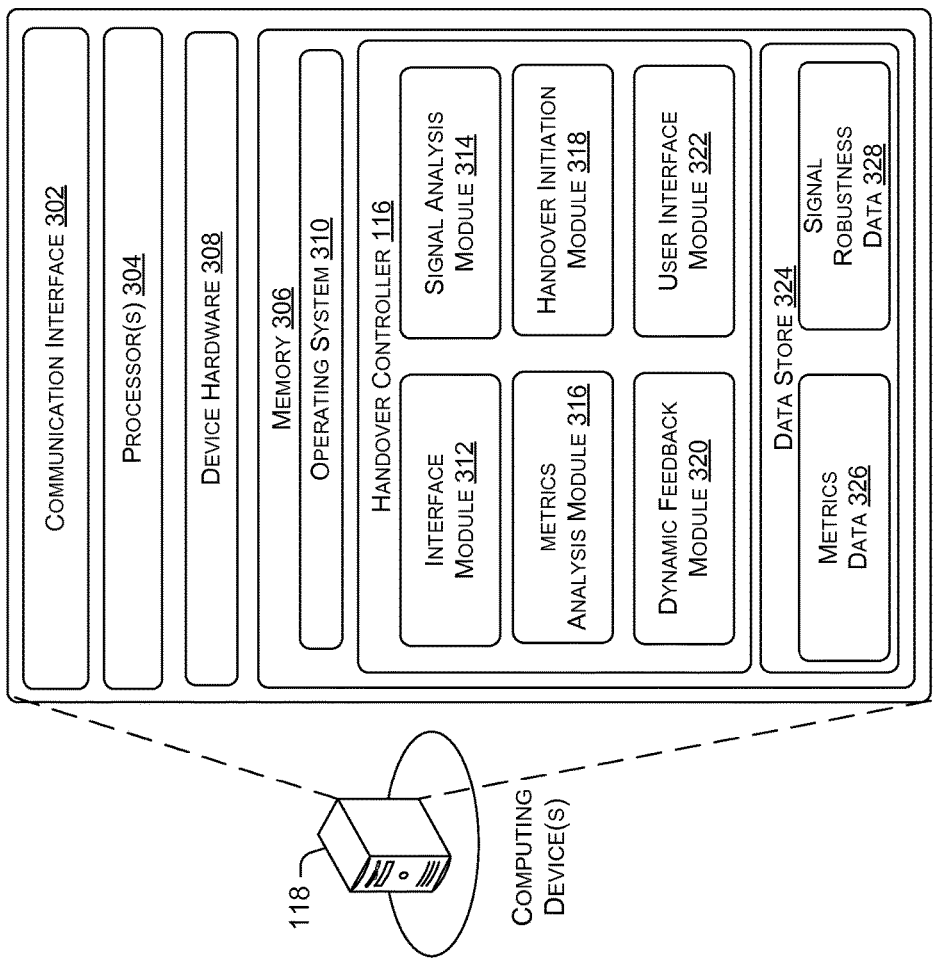
FIG. 3 is a block diagram showing various components of a handover controller of a carrier network that performs quality of experience-based handover management.

FIG. 3 is a block diagram showing various components of a handover controller of a carrier network that performs quality of experience-based handover management. The handover controller 116 may be implemented on one or more computing devices 118. The computing devices 118 may be a part of the radio access network 106 or the core network 108. The one or more computing devices 118 may include a communication interface 302, one or more processors 304, memory 306, and device hardware 308. The communication interface 302 may include wireless and/or wired communication components that enable the computing devices to transmit data to and receive data from other networked devices via the carrier network 102. These devices may include the base stations 110(1)-110(N) and various user devices, such as the user device 104. The device hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the computing devices 118 may implement an operating system 310 and the handover controller 116. The operating system 310 may include components that enable the computing devices 118 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The handover controller 116 may include an interface module 312, a signal analysis module 314, a metrics analysis module 316, a handover initiation module 318, a dynamic feedback module 320, and a user interface module 322. The handover controller 116 may also interact with a data store 324. These modules may include routines, program instructions, objects, and/or data structures that perform particular tasks or implement particular abstract data types.

The interface module 312 may receive quality metric values and associated information from user devices, such as the user device 104. The quality metrics values and associated information may be produced by the metric module 222. The interface module 312 may also receive signal robustness values produced by the signal reporting module 226.

The signal analysis module 314 may analyze the signal robustness values of base stations to determine whether a handover is to be initiated. In various embodiments, if the signal robustness value for an adjacent base station is higher than the signal robustness value of a base station currently connected to the user device 104, the signal analysis module 314 may initiate a handover of the user device 104 from the current base station to the adjacent base station. For example, if the signal robustness value for a currently connected base station is "70" and the signal robustness value for an adjacent base station is "85", the signal analysis module 314 may initiate a handover. In contrast, if the signal robustness value for an adjacent base station is lower than or equal to the signal robustness value of a base station currently connected to the user device 104, the signal analysis module 314 may maintain the user device 104 at current base station.

The metrics analysis module 316 may receive the quality metric values and associated information from multiple user devices, including the user device 104. The received quality metric values and associated information may be stored by the metrics analysis module 316 in the data store 324 as metrics data 326. In various embodiments, each of the user devices may be configured to send the quality metric values and the associated information to the metrics analysis module 316 on a periodic or constant basis. Accordingly, the metrics data 326 may be continuously updated by the metric analysis module 316. The metrics analysis module 316 may compare the metrics data 326 to the current quality metric values provided by a user device to determine whether a handover is to be initiated for the user device.

In some embodiments, the metrics analysis module 316 may receive a current quality metric value of a user device that is associated with a currently connected base station. Accordingly, the metrics analysis module 316 may retrieve from the metrics data 326 comparable quality metric values for an adjacent base station. In these embodiments, a quality metric value may be comparable when the value is pertaining to an identical application (e.g., a particular video streaming application) or an identical class of applications, such as video streaming applications in general, in which the quality metric value is obtained within a predetermined time period of the current quality metric value.

Subsequently, the metrics analysis module 316 may average the comparable quality metric values to obtain an average quality metric value for the adjacent base station. The current quality metric value is compared to the average quality metric value of the adjacent base station by the metrics analysis module 316. Thus, if the average quality metric value is greater than the current quality metric value, the metrics analysis module 316 may initiate a handover of the user device 104 from the currently connected base station to the adjacent base station. Otherwise, the metrics analysis module 316 may maintain the user device 104 at the currently connected base station.

In other embodiments, the metrics analysis module 316 may receive a current quality metric value of a user device that is associated with a currently connected base station. The current quality metric value may be taken when the user device is located at a particular distance (i.e., distance "a") from the currently connected base station. Accordingly, the metrics analysis module 316 may retrieve from the metrics data 326 a comparable quality metric value for an adjacent base station. In these embodiments, a quality metric value may be comparable when several parameters are met. The first parameter may be that the quality metric value pertains to an identical application (e.g., a particular video streaming application) or an equivalent application from an identical class of applications. The second parameter may be that the user device of the identical application or the equivalent application is located at a second distance (i.e., distance "b") from the adjacent base station, in which the second distance is identical or within a predetermined range of the particular distance (i.e., distance "a"). The third parameter may be that the quality metric value is obtained within a predetermined time period of the current quality metric value. In some embodiments, another parameter may be that the identical application also has an identical codec or operates on an identical same operating system. Thus, if the comparable quality metric value is greater than the current quality metric value, the metrics analysis module 316 may initiate a handover of the user device 104 from the currently connected base station to the adjacent base station. Otherwise, the metrics analysis module 316 may maintain the user device 104 at the currently connected base station.

In additional embodiments, the metrics analysis module 316 may receive a current quality metric value of a user device that is associated with a currently connected base station. The current quality metric value may be taken when the user device is located at a particular position (i.e., coordinates "x", "y" and "z") relatively to the currently connected base station. Accordingly, the metrics analysis module 316 may retrieve from the metrics data 326 a comparable quality metric value for an adjacent base station. In these embodiments, a quality metric value may be comparable when several criteria are met. The first parameter may be that the quality metric value pertains to an identical application (e.g., a particular video streaming application) or an equivalent application from an identical class of applications. The second parameter may be that the user device of the identical application or the equivalent application is located at a second position (i.e., coordinates "a", "b", and "c") from the adjacent base station, in which the second position is identical or within predetermined area of the particular position (i.e., coordinates "x", "y" and "z"). The third parameter may be that the quality metric value is obtained within a predetermined time period of the current quality metric value. In some embodiments, another parameter may be that the identical application also has an identical codec or operates on an identical operating system. Thus, if the comparable quality metric value is greater than the current quality metric value, the metrics analysis module 316 may initiate a handover of the user device 104 from the currently connected base station to the adjacent base station. Otherwise, the metrics analysis module 316 may maintain the user device 104 at the currently connected base station.

In various embodiments, a quality metric value may be an aggregate value that is a combination of quality metric values that measure multiple application characteristics (e.g., numbers of video stalls and network latency) or quality metric values for multiple applications (e.g., video streaming application and video application). In such embodiments, the metrics analysis module 316 may compare an aggregate quality metric value associated with a base station with another aggregate quality metric value associated with an adjacent base station. Further, while the comparisons are discussed in the context of a current quality metric value and a comparable quality metric value, the metrics analysis module 316 actually compares a current quality metric value to multiple comparable quality metric values associated with multiple adjacent base stations having signals that are detected by the user device 104.

In further embodiments, the metrics analysis module 316 may adjust the current quality metric value of the user device 104 at the present base station or one or more comparable quality metric values from an adjacent base station prior to making a handover determination. The adjustments may be made to compensate for some unavoidable differences in factors that affect the current quality metric value and a comparable quality metric value. Such adjustments may be made based on based on device factors, geographical factors, and/or network factors. Device factors may include the nature and type of the application on the user device 104 that is currently sending and receiving data. For example, some streaming application may have greater buffer capacity or more data interruption tolerant codecs, and therefore would be more forgiving of network glitches and signal fading. Accordingly, the metrics analysis module 316 may increase the current quality metric value relative to a comparable quality metric value, when the relevant streaming application is more error tolerant as compared to the operating system that generated the comparable quality metric value, and vice versa. Thus, differences in codecs of stream applications may be used to adjust quality metric values.

Other device factor may be the type or nature of the operating system or the network transceiver on the user device 104. Some operating systems or network transceiver may be more tolerant of network signal fluctuations than other operating systems or network transceivers. Thus, the metrics analysis module 316 may increase the current quality metric value relative to a comparable quality metric value, when the relevant operating system is more error tolerant as compared to the operating system that generated the comparable quality metric value, and vice versa. In various embodiments, the metrics module 222 may access these device factors via application program interfaces (APIs) that are provided by the application layer, the operating system layer, the hardware layer, and/or other layers of the user device 104. In turn, the metrics module 222 on the user device 104 may report these device factors to the metric analysis module 316 via the interface module 312.

Geographical factors may include sites with obstructed network signals. An obstructed network signal may be a signal that is partially or completely blocked by a natural or manmade obstacle. In such instances, the metrics analysis module 316 may increase the current quality metric value relative to a comparable quality metric value, when the relevant distance or the relevant position to a current base station has less signal attenuation than a distance or a position of an adjacent base station, and vice versa.

Network factors may include the characteristics of the network signals that are generated by the base stations. For example, network signals of some frequencies and/or output power may fade out gradually as distance to the transceiver increases. However, network signals of other frequencies and/or output power may steeply degrade as distance to the transceiver increases. In such instances, the metrics analysis module 316 may increase the current quality metric value relative to a comparable quality metric value, when the network signal characteristics of a current base station is less prone to fading than the network signal characteristics of an adjacent base station, and vice versa. In some embodiments, the metrics analysis module 316 may use a quality metric conversion algorithm that includes a static or dynamically modifiable translation mapping to convert the device factors, geographical factors, and network factors into value modifications for the quality metrics values.

The handover initiation module 318 may initiate a handover of a user device (e.g., user device 104) from one base station to another base station by sending a handover over command to the user device. In various embodiments, the handover initiation module 318 may initiate a hard handover or a soft handover, depending on the capabilities of the user device and/or carrier network 102. The handover initiation module 318 may initiate a handover based on the requests of the signal analysis module 314 or the metric analysis module 316.

In some embodiments, the handover initiation module 318 may delay the initiation of a handover based on one or more factors based on a handover wait time. These factors may include device application characteristics or radio cell signal characteristics. Device application characteristics may include the network error tolerance of an application that is using the communication channel with a base station. For example, some streaming application may have greater buffer capacity or more data interruption tolerant codecs, and therefore would be more forgiving of network glitches and signal fading. Thus, in such example, it may be better to delay a handover avoid frequent switching between base stations, such that the signal provided by a currently connected base station may have a chance to recover. The radio cell signal may include characteristics such as waveform shape, wave spectrum, and attenuation characteristics. For example, network signals of some frequencies and/or output power may fade out gradually as distance to the transceiver increases. However, network signals of other frequencies and/or output power may steeply degrade as distance to the transceiver increases. Thus, in such an example, it may be better to delay a handover when a network signal of the currently connected base station is of a type that fades gradually over a distance, so as to avoid premature handover of the user device to an adjacent base station as the user device may once again come closer to the base station. In such embodiments, the handover initiation module 318 may use a static or dynamic wait time conversion mapping to convert the presence of one or more characteristics into the handover wait time.

The dynamic feedback module 320 may analyze the network effect of the quality of experience-based handover management as implemented by the handover controller 116 and the handover logics on the individual user devices. The network effects may include measurements on the amount of communication at each of the base stations, measurements on congestion as manifested by call drops and network slows, measurements on request response latency and data throughput, and/or other network load measurements. Based on the analysis of the network effects, the dynamic feedback module 320 may adjust the values that are generated by modifying the metric translation mapping of the quality metric translation algorithm on the user device 104, the metric conversion mapping of the metric conversion algorithm of the metrics analysis module 316, or the wait time conversion mapping of the handover initiation module 318. Such adjustment may vary the amount of the signal robustness offset values or the quality metric values that are generated, among other values. For example, the dynamic feedback module 320 may translate the difference of "2" in the quality metric values to a signal robustness offset value of "10" instead of the normal "20" to alleviate network congestion at the adjacent base station. In another example, the amount of a quality metrics value for a more signal interruption tolerant streaming application that is currently communicating with a base station may be lessened to encourage handoff to an adjacent base station.

In various embodiments, such network analysis and corresponding value adjustments may be performed by a machine learning algorithm of the dynamic feedback module 320. The machine learning algorithm may use various approaches, such as supervised learning, unsupervised learning, semi-supervised learning, naïve Bayes, Bayesian networks, decision trees, neural networks, fuzzy logic models, and/or probabilistic classification models to dynamically perform the conversion adjustments.

The user interface module 322 may enable an administrator to interact with the modules of the handover controller 116 via data input devices and data output devices. For example, the user interface module 322 may enable the administrator to select the type or the source of data that is analyzed by the metric analysis module 316. In another example, the administrator may also use the user interface module 322 manually adjust the offset values and quality metric value modifications.

The data store 324 may store data that are used by the various modules of the handover controller 116. The data store 324 may include one or more databases, such as relational databases, object databases, object-relational databases, and/or key-value databases. In at least some embodiments, the data store 324 may store the metric data 326. The data store 324 may also store other data that are received or generated by the modules of the handover controller 116, such as signal robustness data 328, as well as conversion and translation mappings.

Example Processes

FIGS. 4-9 present illustrative processes 400-900 for implementing quality of experience-based handover management. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to the scheme 100 of FIG. 1.

Figure 4:
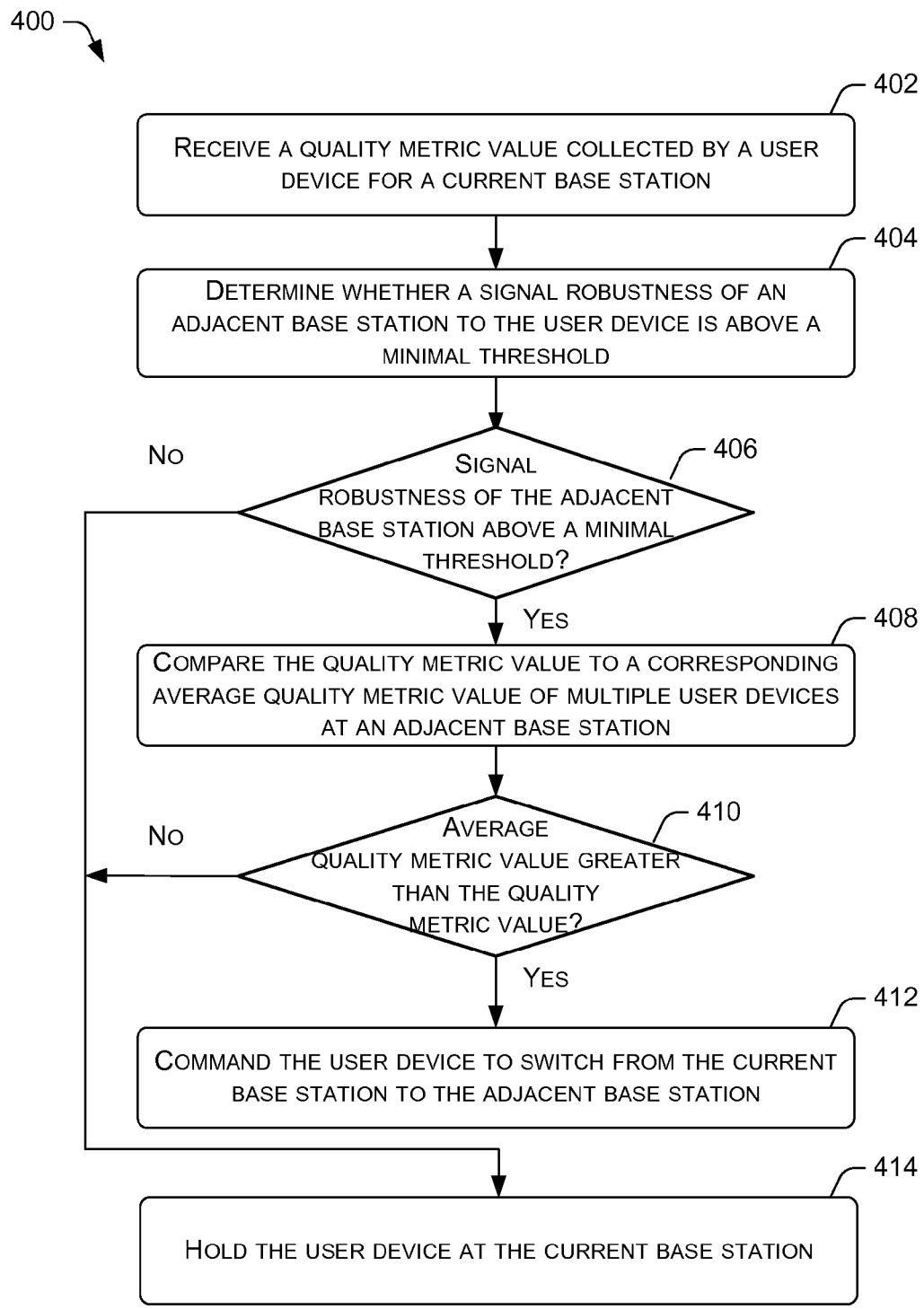
FIG. 4 is a flow diagram of an example process for performing quality of experience-based handover management that is supplemented by signal assessment.

FIG. 4 is a flow diagram of an example process 400 for performing quality of experience-based handover management that is supplemented by signal assessment. At block 402, the handover controller 116 may receive a quality metric value obtained by a user device, such as the user device 104, for a current base station. The quality metric value may measure a single quality of experience characteristic of an application on the user device. Alternatively, the quality metric value may be an aggregate value that measures multiple quality of experience characteristics of the application on the user device or an aggregate value that measures multiple quality of experience characteristics of multiple applications.

At block 404, the handover controller 116 may determine whether a signal robustness of an adjacent base station to the user device is above a minimal threshold. The minimal threshold may be configured to ensure that the user device is able to effectively communicate with the adjacent base station, but does not exclude the ability of the user device to switch over to the adjacent base station simply because its signal is less robust than the signal of the current base station. Signal robustness may be quantified by signal strength (e.g., RSSI) or signal quality (e.g., SINR). Thus, at decision block 406, if the handover controller 116 determines that the signal robustness of the adjacent base station is above the predetermined threshold, ("yes" at decision block 406), the process 400 may continue to block 408.

At block 408, the handover controller 116 may compare the quality metric value to a corresponding average quality metric value of multiple user devices at the adjacent base station. The corresponding average quality metric value may be derived from quality of experience characteristic of the same application on the multiple user devices. Alternatively, the corresponding average quality metric value may be derived from the same multiple quality of experience characteristics of the application on the multiple user devices or the same multiple quality of experience characteristics of multiple applications. In other words, the quality metric value for the current base station and the corresponding average quality metric value for the adjacent base station are for the same quality of experience characteristic or characteristics.

At decision block 410, the handover controller 116 may determine whether the average quality metric value is greater than the quality metric value for the current base station. If the handover controller 116 determines that the average metric value is greater than the quality metric value, the process 400 may proceed to block 412. At block 412, the handover controller 116 may command the user device to switch from communicating with the current base station to communicating with the adjacent base station. In various embodiments, the switch may be performed by the user device via a hard handover or a soft handover, depending on the capabilities of the user device and the carrier network 102.

Returning to decision block 406, if the handover controller 116 determines that the signal robustness of the adjacent base station is not above a minimal threshold ("no" at decision block 406), the process 400 may proceed to block 414. At block 414, the handover controller 116 may hold the user device at the current base station. The handover controller 116 may achieve the hold by refraining from sending a handover command to the user device. In some embodiments, the handover controller 116 may repeat the process 400 for another adjacent base station. In other embodiments, after holding the user device, the handover controller 116 may use a conventional signal robustness-based handover algorithm to perform handover management of the user device. Further, returning to decision block 410, if the handover controller 116 determines that the average quality metric value of the adjacent cell is not greater than the quality metric value of the current cell ("no" at decision block 410), the process 400 may also proceed to block 414. Once again, at block 414, the handover controller 116 may hold the user device at the current base station.

Figure 5:
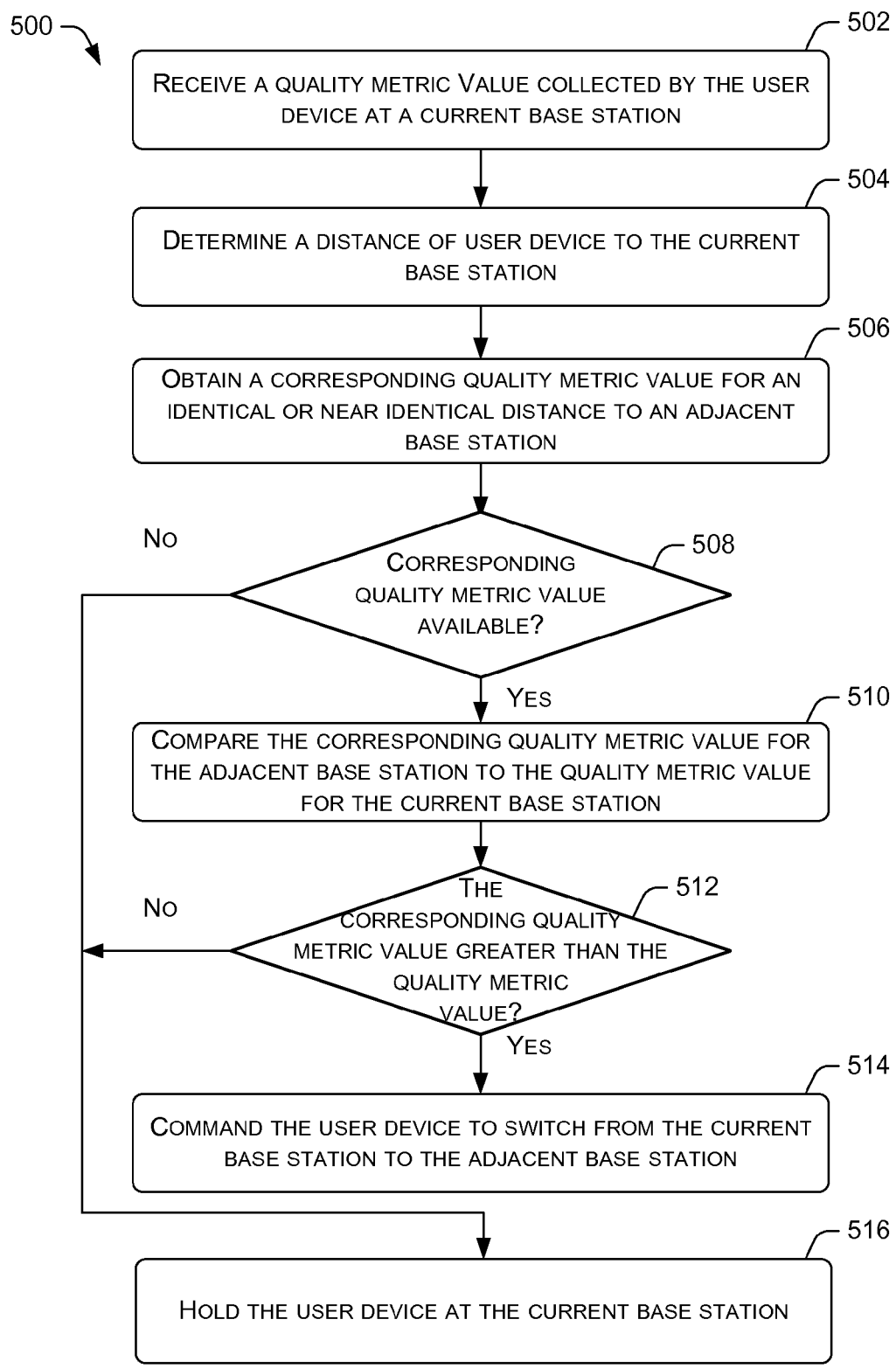
FIG. 5 is a flow diagram of an example process for performing quality of experience-based handover management based on a distance of a user device to a current base station.

FIG. 5 is a flow diagram of an example process 500 for performing quality of experience-based handover management based on a distance of a user device to a current base station. At block 502, the handover controller 116 may receive a quality metric value obtained by a user device, such as the user device 104, for a current base station. The quality metric value may measure a single quality of experience characteristic of an application on the user device. Alternatively, the quality metric value may be an aggregate value that measures multiple quality of experience characteristics of the application on the user device or an aggregate value that measures multiple quality of experience characteristics of multiple applications.

At block 504, the handover controller 116 may determine a distance of the user device to the current base station. The handover controller 116 may make this determination based on a distance reported by the user device, calculate the distance based on a position reported by the user device, or a radio triangulated position of the user device from the location of the current base station.

At block 506, the handover controller 116 may search the data store 324 and obtain a corresponding quality metric value at an identical or near identical distance to an adjacent base station. The corresponding quality metric value may be derived from quality of experience characteristic of the same application on a similar or identical user device. Alternatively, the corresponding quality metric value may be derived from the same multiple quality of experience characteristics of multiple applications on the similar or identical user device. In other words, the quality metric value for the current base station and the corresponding quality metric value for the adjacent base station are for the same quality of experience characteristic or characteristics. Further, near identical distance means a distance that is within a predetermined threshold of the identical distance (e.g., 200 feet, 0.1 mile, etc.).

At decision block 508, the handover controller 116 may determine whether a corresponding quality metric value is available from the data store 324. Thus, if the handover controller determines that the corresponding quality metric value is available ("yes" at decision block 508), the process 500 may proceed to block 510.

At block 510, the handover controller 116 may compare the corresponding quality metric value for the adjacent base station to the quality metric value for the current base station. In various embodiments, the handover controller 116 may determine whether the signal robustness of a signal from the adjacent base station is above a minimal threshold, and may only perform the comparison if the signal robustness is above the minimal threshold. Otherwise, the handover controller 116 may hold the user device at the current base station. In some embodiments, prior to the comparison, the handover controller 116 may modify the quality metric value or the corresponding metric value based on one or more factors. These factors include device factors of the user device, geographical factors related to the current base station or the adjacent base station, and/or network factors related to the current base station or the adjacent base station.

At decision block 512, the handover controller 116 may determine whether the corresponding quality metric value of the adjacent base station is greater than the quality metric value of the current base station. Accordingly, if the handover controller 116 determines that the corresponding quality metric value of the adjacent base station is greater than the quality metric value of the current station ("yes" at decision block 512), the process 500 may proceed to block 514.

At block 514, the handover controller 116 may command the user device to switch from communicating with the current base station to communicating with the adjacent base station. In various embodiments, the switch may be performed by the user device via a hard handover or a soft handover, depending on the capabilities of the user device and the carrier network 102.

Returning to decision block 508, if the handover controller 116 determines that no corresponding quality metric value for the adjacent base station is available ("no" at decision block 508), the process 500 may proceed to block 516. At block 516, the handover controller 116 may hold the user device at the current base station. The handover controller 116 may achieve the hold by refraining from sending a handover command to the user device. In some embodiments, the handover controller 116 may repeat the process 500 for another adjacent base station. In other embodiments, after holding the user device, the handover controller 116 may use a conventional signal robustness-based handover algorithm to perform handover management of the user device. Further, returning to decision block 512, if the handover controller 116 determines that the corresponding quality metric value of the adjacent cell is not greater than the quality metric value of the current cell ("no" at decision block 512), the process 400 may also proceed to block 516. Once again, at block 516, the handover controller 116 may hold the user device at the current base station.

Figure 6:
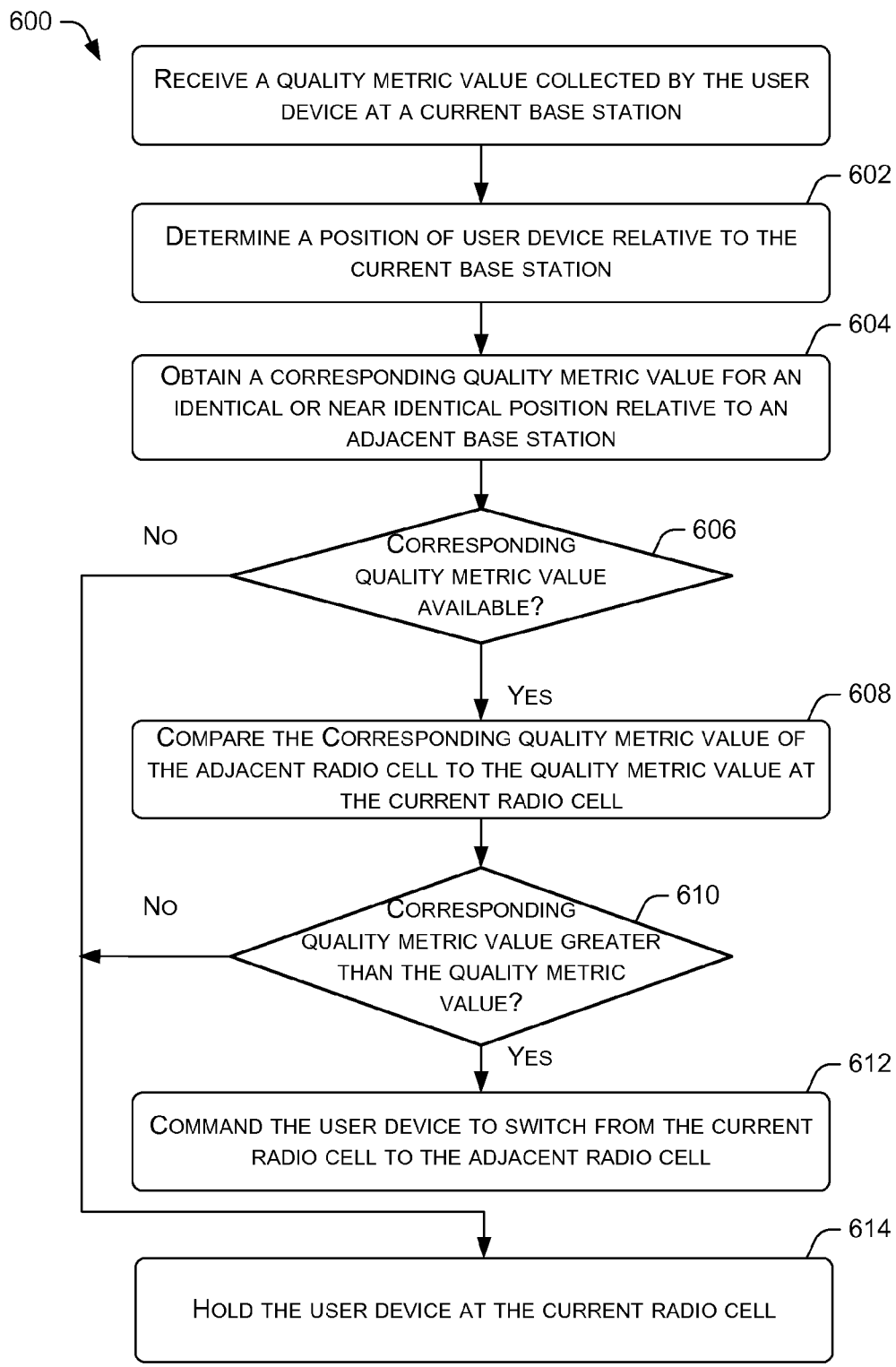
FIG. 6 is a flow diagram of an example process for performing quality of experience-based handover management based on a position of a user device to a current base station.

FIG. 6 is a flow diagram of an example process 600 for performing quality of experience-based handover management based on a position of a user device to a current base station. At block 602, the handover controller 116 may receive a quality metric value obtained by a user device, such as the user device 104, for a current base station. The quality metric value may measure a single quality of experience characteristic of an application on the user device. Alternatively, the quality metric value may be an aggregate value that measures multiple quality of experience characteristics of the application on the user device or an aggregate value that measures multiple quality of experience characteristics of multiple applications.

At block 604, the handover controller 116 may determine a position of the user device to the current base station. The handover controller 116 may make this determination based on a position reported by the user device or a radio triangulated position of the user device.

At block 606, the handover controller 116 may search the data store 324 and obtain a corresponding quality metric value at an identical or near identical position to an adjacent base station. The corresponding quality metric value may be derived from quality of experience characteristic of the same application on a similar or identical user device. Alternatively, the corresponding quality metric value may be derived from the same multiple quality of experience characteristics of multiple applications on the similar or identical user device. In other words, the quality metric value for the current base station and the corresponding quality metric value for the adjacent base station are for the same quality of experience characteristic or characteristics. Further, near identical position means a position that is within a predetermined threshold of the identical position (e.g., 200 feet radius, 0.1 mile radius, etc.).

At decision block 608, the handover controller 116 may determine whether a corresponding quality metric value is available from the data store 324. Thus, if the handover controller determines that the corresponding quality metric value is available ("yes" at decision block 608), the process 600 may proceed to block 610.

At block 610, the handover controller 116 may compare the corresponding quality metric value for the adjacent base station to the quality metric value for the current base station. In various embodiments, the handover controller 116 may determine whether the signal robustness of a signal from the adjacent base station is above a minimal threshold, and may only perform the comparison if the signal robustness is above the minimal threshold. Otherwise, the handover controller 116 may hold the user device at the current base station. In some embodiments, prior to the comparison, the handover controller 116 may modify the quality metric value or the corresponding metric value based on one or more factors. These factors include device factors of the user device, geographical factors related to the current base station or the adjacent base station, and/or network factors related to the current base station or the adjacent base station.

At decision block 612, the handover controller 116 may determine whether the corresponding quality metric value of the adjacent base station is greater than the quality metric value of the current base station. Accordingly, if the handover controller 116 determines that the corresponding quality metric value of the adjacent base station is greater than the quality metric value of the current station ("yes" at decision block 612), the process 600 may proceed to block 614.

At block 614, the handover controller 116 may command the user device to switch from communicating with the current base station to communicating with the adjacent base station. In various embodiments, the switch may be performed by the user device via a hard handover or a soft handover, depending on the capabilities of the user device and the carrier network 102.

Returning to decision block 608, if the handover controller 116 determines that no corresponding quality metric value for the adjacent base station is available ("no" at decision block 608), the process 600 may proceed to block 516. At block 616, the handover controller 116 may hold the user device at the current base station. The handover controller 116 may achieve the hold by refraining from sending a handover command to the user device. In some embodiments, the handover controller 116 may repeat the process 600 for another adjacent base station. In other embodiments, after holding the user device, the handover controller 116 may use a conventional signal robustness-based handover algorithm to perform handover management of the user device. Further, returning to decision block 612, if the handover controller 116 determines that the corresponding quality metric value of the adjacent cell is not greater than the quality metric value of the current cell ("no" at decision block 612), the process 400 may also proceed to block 616. Once again, at block 616, the handover controller 116 may hold the user device at the current base station.

Figure 7:
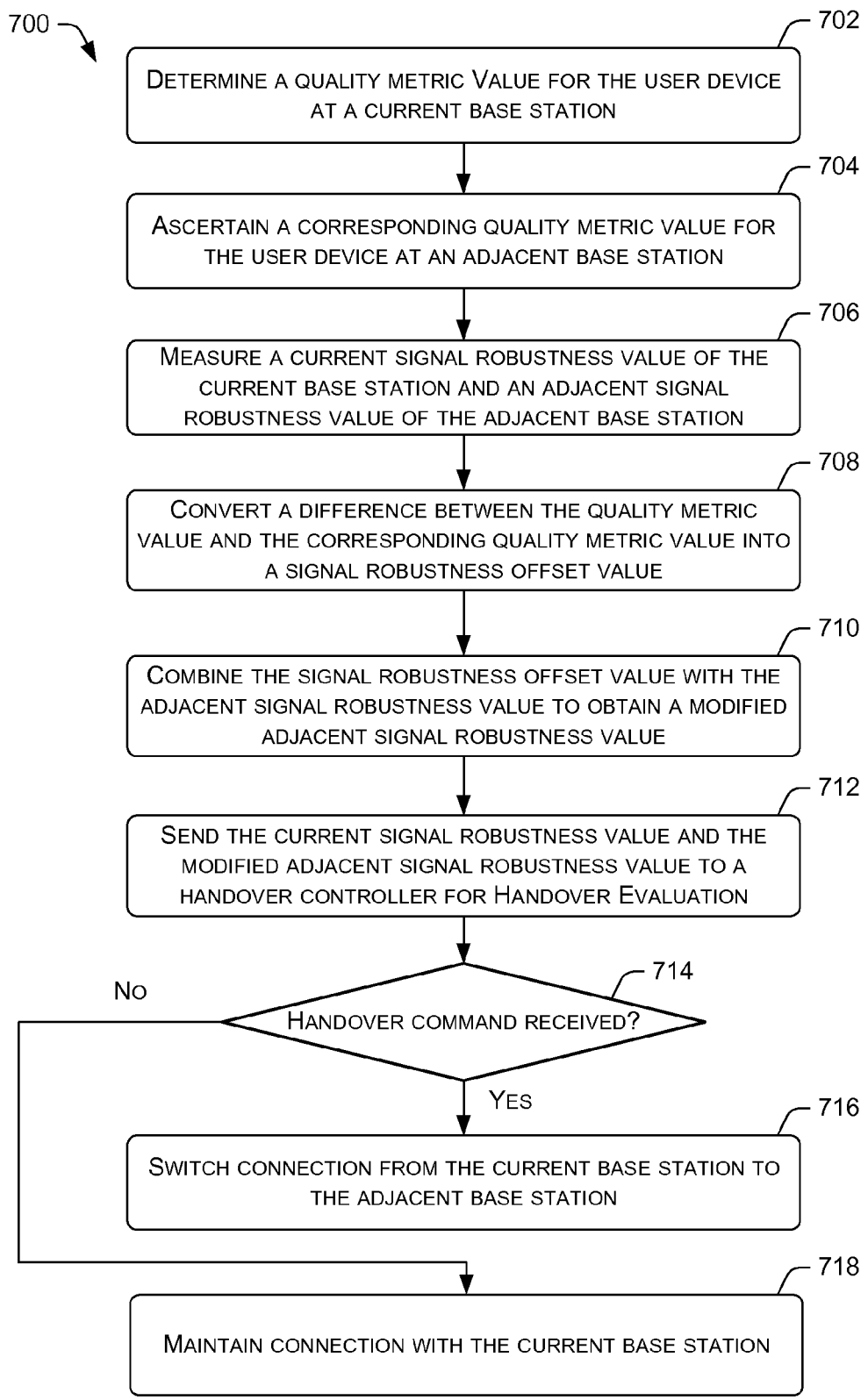
FIG. 7 is a flow diagram of an example process for performing quality of experience-based handover management using a signal robustness offset value.

FIG. 7 is a flow diagram of an example process 700 for performing quality of experience-based handover management using a signal robustness offset value. At block 702, the device handover logic 132 of the user device 104 may determine a quality metric value for a user device at a current base station. The quality metric value may measure a single quality of experience characteristic of an application on the user device. Alternatively, the quality metric value may be an aggregate value that measures multiple quality of experience characteristics of the application on the user device or an aggregate value that measures multiple quality of experience characteristics of multiple applications.

At block 704, the device handover logic 132 may ascertain a corresponding quality metric value for the user device at an adjacent base station. In various embodiments, the device handover logic 132 may receive the corresponding quality metric value from the handover controller 116. The corresponding quality metric value may be derived from quality of experience characteristic of the same application on a similar or identical user device. Alternatively, the corresponding quality metric value may be derived from the same multiple quality of experience characteristics of multiple applications on the similar or identical user device. In other words, the quality metric value for the current base station and the corresponding quality metric value for the adjacent base station are for the same quality of experience characteristic or characteristics.

At block 706, the device handover logic 132 may measure a current signal robustness value of the current base station and an adjacent signal robustness value of an adjacent base station. In various embodiments, each signal robustness may be quantified by signal strength (e.g., RSSI) or signal quality (e.g., SINR). At block 708, the device handover logic 132 may convert the difference between the quality metric value and the corresponding quality metric value into a signal robustness offset value. In some embodiments, device handover logic 132 may further modify the signal robustness offset value based on device factors, geographical factors, and/or network factors.

At block 710, the device handover logic 132 may combine the signal robustness offset value with the adjacent signal robustness value to obtain a modified adjacent signal robustness value. The combination may be performed by aggregating the two values together to obtain a sum that is the modified adjacent signal robustness value. In this way, the adjacent signal robustness value may be increased or decreased by the signal robustness offset value.

At block 712, the device handover logic 132 may send the current signal robustness value and the modified adjacent signal robustness value to the handover controller 116 for handover evaluation. In various embodiments, the handover controller 116 may initiate the handover of the user device from the current base station to the adjacent base station if the modified adjacent signal robustness value is greater than the current signal robustness value. In contrast, the handover controller 116 may command the user device to maintain a connection with the current base station if the modified adjacent signal robustness value is less than or equal to the current signal robustness value.

Thus at decision block 714, if the device handover logic 132 receives a handover command from the handover controller 116, the process may proceed to block 716. At block 716, the device handover logic 132 may switch the connection of the user device from the current base station to the adjacent base station via a hard handover or a soft handover. However, if the device handover logic 132 does not receive a handover command from the handover controller 116, the process 700 may proceed to block 718. At block 718, the device handover logic 132 may cause the user device to maintain the communication connection with the current base station.

Figure 8:
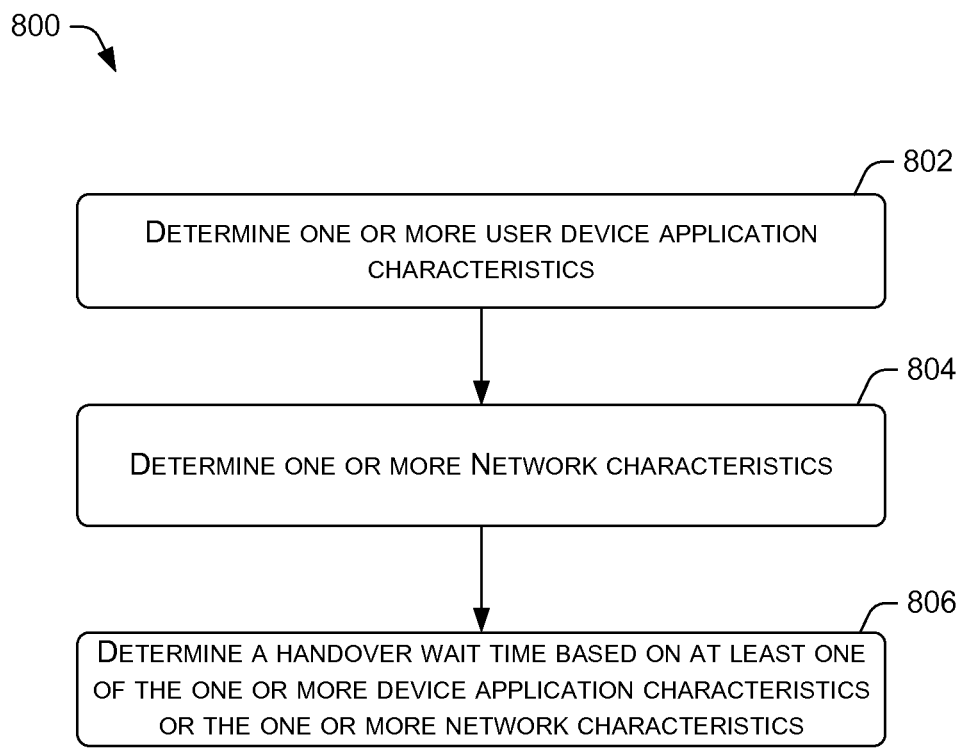
FIG. 8 is a flow diagram of an example process for determining a handover wait time for a user device based on one or more application and network characteristics.

FIG. 8 is a flow diagram of an example process 800 for determining a handover wait time for a user device based on one or more application and network characteristics. At block 802, the handover controller 116 may determine one or more device application characteristics. The device application characteristics may include the network error tolerance of an application that is communicating with a base station. For example, some streaming application may have greater buffer capacity or more data interruption tolerant codecs, and therefore would be more forgiving of network glitches and signal fading.

At block 804, the handover controller 116 may determine one or more network characteristics. The network characteristics may include radio cell signal characteristics such as waveform shape, wave spectrum, and attenuation characteristics. For example, network signals of some frequencies and/or output power may fade out gradually as distance to the transceiver increases. However, network signals of other frequencies and/or output power may steeply degrade as distance to the transceiver increases.

At block 806, the handover controller 116 may determine a handover wait time based on at least one of the one or more device application characteristics or the one or more network characteristics. In various embodiments, the handover controller 116 may use a static or dynamic conversion mapping to convert the presence of one or more characteristics into the handover wait time.

Figure 9:
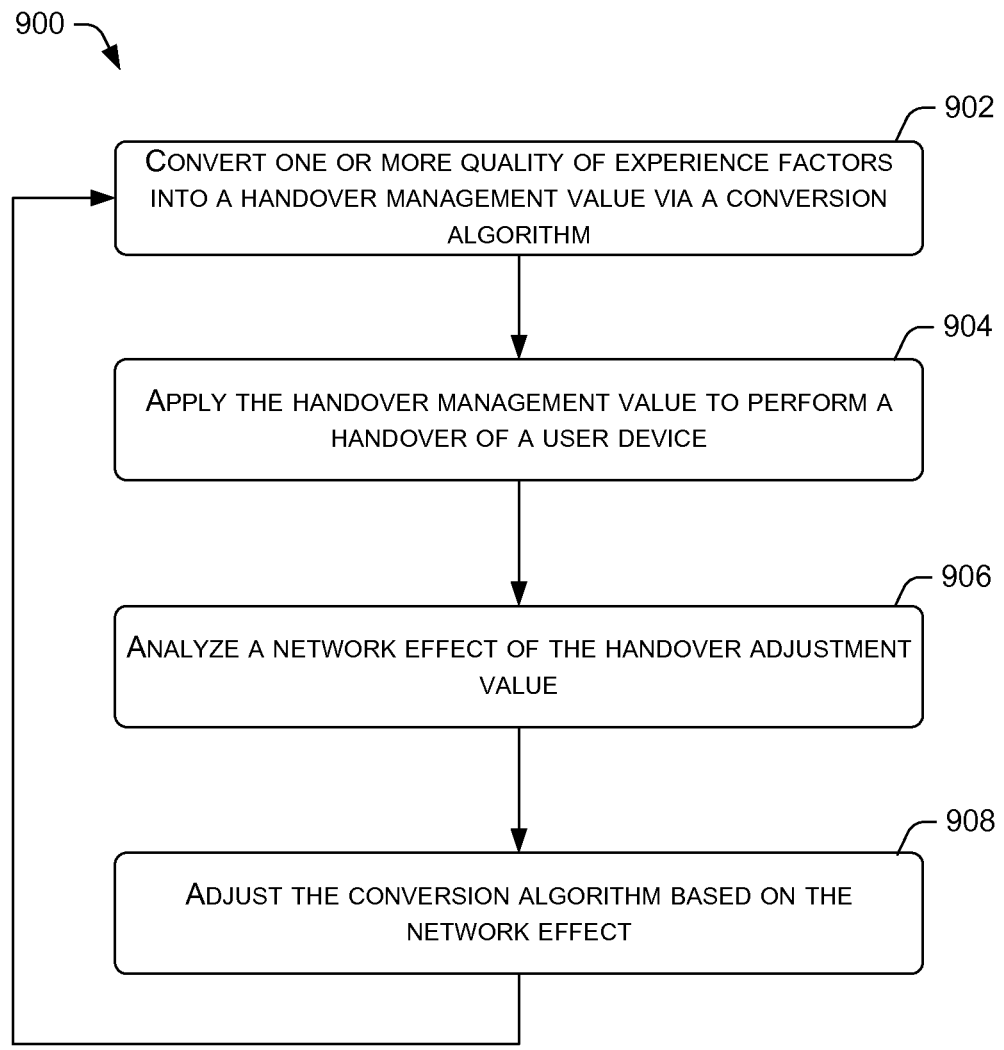
FIG. 9 is a flow diagram of an example process for dynamically changing one or more handover adjustment values used in quality of experience-based handover management.

FIG. 9 is a flow diagram of an example process 900 for dynamically changing one or more handover adjustment values used in quality of experience-based handover management. At block 902, the handover controller 116 or the device handover logic 132 may convert one or more quality of experience factors into a handover management value via a conversion algorithm. The quality of experience factors may include application performance characteristics of at least one application installed on a user device, device factors of the user device, geographical factors affecting carrier network, and network factors of the carrier network that is used by the user device. In various embodiments, the handover management value may be a signal robustness offset value or a quality metric value. The conversion algorithm may be the quality metric translation algorithm of the device handover logic 132 or the metric conversion algorithm of the handover controller 116.

At block 904, the handover controller 116 may apply the handover management value to perform a handover of the user device. In instances in which the handover management value is a signal robustness offset value, such a value may be combined with a signal robustness value for analysis by the handover controller 116. In instances in which the handover management value is a quality metric value, the handover controller 116 may compare the quality metric value with a corresponding quality metric value associated with another base station to determine whether a handover is to occur.

At block 906, the handover controller 116 may analyze a network effect of the handover adjust value. The network effects may include measurements on the amount of communication at each of the base stations, measurements on congestion as manifested by call drops and network slows, measurements on request response latency and data throughput, and/or other network load measurements.

At block 908, the handover controller 116 may adjust the conversion algorithm based on the network effect. In various embodiments, the adjustment may include modifying the metric translation mapping of the quality metric translation algorithm on the user device 104, the metric conversion mapping of the metric conversion algorithm used by the metrics analysis module 316, or another conversion algorithm. The adjustment may cause the conversion algorithm to produce a different handover management value from an identical set of quality of experience factors.

The techniques may enable a telecommunication carrier to use quality of experience metrics that measure performance characteristics of user device applications at multiple base stations of a carrier network to manage user device handovers. Such handover management avoids the use of network signal strength or quality as the sole basis for performing handovers. The use of signal strength or quality fails to account for different service demands of various applications on user devices. Thus, having the capability to adjust handover criteria on a per application basis provides flexibility in network performance optimization.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors; and
memory having instructions stored therein, the instructions, when executed by the one or more processors, cause the one or more processors to perform acts comprising:
receiving a quality metric value obtained by a user device for a current base station of a carrier network, the quality metric value is an aggregate value of individual quality metric values measuring multiple quality of experience characteristics of multiple applications on the user device as the user device is communicating with the current base station;
determining whether a signal robustness of a signal provided by an adjacent base station relative to a predetermined minimal threshold initiates a comparison of the quality metric value of the current base station to a corresponding quality metric value for the adjacent base station;
comparing the quality metric value of the current base station to the corresponding quality metric value for the adjacent base station of the carrier network in response to determining that the signal robustness of the signal provided by the adjacent base station is above the predetermined minimal threshold, the corresponding quality metric value is an additional aggregate value of additional individual quality metric values measuring multiple quality of experience characteristics of multiple additional applications on an additional user device that communicated with the adjacent base station; and
commanding the user device to perform a handover that switches the user device from communicating with the current base station to communicating with the adjacent base station in response to the corresponding quality metric value being greater than the quality metric value.

2. The system of claim 1, further comprising holding the user device at the current base station in response to the corresponding quality metric value being less than or equal to the quality metric value.

3. The system of claim 1, wherein the quality metric value is derived from the one or more quality of experience characteristics via a conversion algorithm, further comprising:
analyzing a network effect of the handover performed based on the quality metric value on the carrier network; and
adjusting the conversion algorithm based on the network effect to produce a different quality metric value from the one or more quality of experience characteristics.

4. The system of claim 1, further comprising modifying the quality metric value for the current base station or the corresponding quality metric value for the adjacent base station based on at least one of a difference in application codec, a difference in operating system platform, a difference in geographical signal influence, or a difference in network signal property associated with an application that is communicating with the current base station and an additional application that communicated with the adjacent base station.

5. The system of claim 1, wherein the commanding includes commanding the user device to perform a delayed handover in response to determining that a network signal of the current base station gradually fades over a distance rather than steeply degrades over the distance.

6. The system of claim 1, wherein the multiple quality of experience characteristics include at least two of a video mean opinion score for a time period, a number of video stalls in the time period, a number of adaptive bit rate changes in the time period, or a number of audio/video synchronization failure events in the time period.

7. The system of claim 1, wherein the multiple applications include a video streaming application.

8. The system of claim 1, wherein the multiple applications include an audio streaming application, and the multiple quality of experience characteristics of the multiple applications include an audio mean opinion score for a time period or a number of audio loss events in the time period.

9. The system of claim 1, wherein the multiple applications include a gaming application, and the multiple quality of experience characteristics of the multiple applications include a response latency of a network to the game application.

10. The system of claim 1, wherein the multiple applications or the multiple additional applications include a plurality of streaming applications that have an identical codec or a common operating system platform.

11. The system of claim 1, wherein the individual quality metric values are standardized or normalized for aggregation into the quality metric value.

12. The system of claim 1, wherein the corresponding quality metric value is obtained for an additional user device that has an identical distance to the adjacent base station as a distance of the user device to the current base station, or obtained for the additional user device that has an identical position relative to the adjacent base station as a position of the user device to the current base station.

13. One or more non-transitory computer-readable media storing computer-executable instructions that upon execution cause one or more processors to perform acts comprising:

determining a quality metric value for a user device at a current base station of a carrier network, the quality metric value measuring one or more quality of experience characteristics of at least one application that is in communication with the current base station;

ascertaining a corresponding quality metric value for an adjacent base station of the carrier network, the corresponding quality metric value is an average value of a plurality of quality metric values measuring quality of experience characteristics of multiple comparable applications within a time period on multiple user devices that communicated with the adjacent base station;

measuring a current signal robustness value of the current base station and an adjacent signal robustness value of the adjacent base station;

combining the adjacent signal robustness value with a signal robustness offset value to obtain a modified adjacent signal robustness value for the adjacent base station, the signal robustness offset value being derived from a difference between the quality metric value of the current base station and the corresponding quality metric value of the adjacent base station;

sending the current signal robustness value of the current base station and the modified adjacent signal robustness value of the adjacent base station to a computing device; and switching the user device from communicating with the current base station to communicating with the adjacent base station in response to a handover command from the computing device, the handover command being provided by the computing device in response to the modified adjacent signal robustness value of the adjacent base station being greater than the current signal robustness value of the current base station.

14. The one or more non-transitory computer-readable media of claim 13, further comprising maintaining a communication connection between the user device and the current base station in response to the computing device determining that the modified adjacent signal robustness value is equal to or less than the current signal robustness value.

15. The one or more non-transitory computer-readable media of claim 13, further comprising adjusting the modified adjacent signal robustness value based on at least one of a codec difference between an application that is communicating with the current base station and an application that communicated with the adjacent base station, a geographical location of the user device relative to the current base station, or a signal attenuation difference between a signal provided by the current base station and an additional signal provided by the adjacent base station.

16. The one or more non-transitory computer-readable media of claim 13, wherein the sending includes sending the current signal robustness value and the modified adjacent signal robustness value in response to determining that a signal robustness of a signal provided by the adjacent base station is above a predetermined threshold.

17. The one or more non-transitory computer-readable media of claim 13, wherein each signal robustness value measures a signal strength or signal quality of a signal provided by a corresponding base station.

18. A computer-implemented method, comprising:

determining, at one or more computing devices, a quality metric value for a user device at a current base station of a carrier network via a conversion algorithm, the quality metric value measuring one or more quality of experience characteristics of at least one application that is in communication with the current base station;

ascertaining, at the one or more computing devices, a corresponding quality metric value for an adjacent base station of the carrier network, the corresponding quality metric value is an average value of a plurality of values measuring quality of experience characteristics of multiple comparable applications within a time period on multiple user devices that communicated with the adjacent base station;

measuring, at the one or more computing devices, a current signal robustness value of the current base station and an adjacent signal robustness value of the adjacent base station;

combining, at the one or more computing devices, the adjacent signal robustness value with a signal robustness offset value to obtain a modified adjacent signal robustness value for the adjacent base station, the signal robustness offset value being derived from a difference between the quality metric value of the current base station and the corresponding quality metric value of the adjacent base station; and switching, via the one or more computing devices, the user device from communicating with the current base station to communicating with the adjacent base station in response to the modified adjacent signal robustness value of the adjacent base station being greater than the current signal robustness value of the current base station.

19. The computer-implemented method of claim 18, further comprising maintaining, via the one or more computing devices, a communication connection between the user device and the current base station in response to the one or more computing devices determining that the modified adjacent signal robustness value is equal to or less than the current signal robustness value.

20. The computer-implemented method of claim 18, further comprising:

analyzing, at the one or more computing devices, a network effect of the switching of the user device from communicating with the current base station to communicating with the adjacent base station; and adjusting, at one or more computing devices, the conversion algorithm based on the network effect to produce a different quality metric value from the one or more quality of experience characteristics.

* * * * *